United States Patent
Annan et al.

(10) Patent No.: US 9,549,009 B1
(45) Date of Patent: Jan. 17, 2017

(54) ELECTRONIC FIXED BRAND LABELING

(71) Applicant: Sprint Communications Company L.P., Overland Park, KS (US)

(72) Inventors: Brandon C. Annan, Westwood Hills, KS (US); John E. Belser, Olathe, KS (US); Dale S. Schempp, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 296 days.

(21) Appl. No.: 13/763,443

(22) Filed: Feb. 8, 2013

(51) Int. Cl.
*H04L 29/08* (2006.01)
*H04L 29/06* (2006.01)

(52) U.S. Cl.
CPC ......... *H04L 65/60* (2013.01); *H04L 29/08081* (2013.01)

(58) Field of Classification Search
USPC .......................................................... 709/219
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 7,027,773 B1 | 4/2006 | McMillin | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 7,991,988 B2 | 8/2011 | Chen | |
| 8,107,926 B2 | 1/2012 | Goto | |
| 8,185,097 B2 | 5/2012 | Vanderlinden et al. | |
| 8,185,101 B1 | 5/2012 | Wiseman et al. | |
| 8,249,654 B1 | 8/2012 | Zhu | |
| 8,260,281 B2 | 9/2012 | Urbanek | |

(Continued)

FOREIGN PATENT DOCUMENTS

| | | |
|---|---|---|
| EP | 2461613 A1 | 6/2012 |
| GB | 2292047 A | 2/1996 |

(Continued)

OTHER PUBLICATIONS

Amazon Kindle e-book reader, on public sale in 2007 (Amazon Kindle Wikipedia article attached for reference).*

(Continued)

*Primary Examiner* — Brendan Higa
*Assistant Examiner* — Leon Y Tseng

(57) ABSTRACT

Systems and methods for electrophoretically displaying a brand identifier of a telecommunications service provider or equipment manufacturer on the portable electronic device. The branding may be set at the manufacturer or when the user first powers the phone on. In addition, the branding may be wiped and reset if there is a change in ownership and/or telecommunications service provider of the portable electronic device. Periodically upon startup after the branding has been set and locked, making a user unable to manually change the branding at will, the portable electronic device may check to ensure the displayed branding is the same as or equivalent to the current brand.

17 Claims, 8 Drawing Sheets

(56) References Cited

U.S. PATENT DOCUMENTS

| | | |
|---|---|---|
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,571,536 B2 | 10/2013 | Urbanek |
| 8,612,967 B1 | 12/2013 | Delker |
| 8,626,165 B1 | 1/2014 | Narasimhan et al. |
| 8,639,245 B2 | 1/2014 | Shi et al. |
| 8,666,383 B1 | 3/2014 | Mauer et al. |
| 8,699,377 B2 | 4/2014 | Veillette |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,211 B2 | 12/2014 | Huq et al. |
| 8,909,291 B1 | 12/2014 | Spanel et al. |
| 8,938,436 B2 | 1/2015 | Kozempel |
| 8,965,366 B1 | 2/2015 | Somayajula et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,307,400 B1 | 4/2016 | Blinn et al. |
| 9,313,643 B1 | 4/2016 | Ghoshal et al. |
| 9,357,378 B1 | 5/2016 | Delker et al. |
| 9,363,622 B1 | 6/2016 | Ahn et al. |
| 9,392,395 B1 | 7/2016 | Indurkar |
| 9,398,462 B1 | 7/2016 | Delker et al. |
| 9,420,399 B2 | 8/2016 | Urbanek |
| 9,420,496 B1 | 8/2016 | Indurkar |
| 9,426,641 B1 | 8/2016 | Ghoshal et al. |
| 9,439,025 B1 | 9/2016 | Ghoshal et al. |
| 9,451,446 B2 | 9/2016 | Spanel et al. |
| 2002/0091931 A1 | 7/2002 | Quick, Jr. et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1* | 7/2004 | Clark et al. ............. 455/418 |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0121894 A1 | 6/2006 | Ganesan |
| 2006/0126620 A1 | 6/2006 | Bonar et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1* | 6/2007 | U. Tenhunen et al. ......... 707/10 |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0042619 A1 | 2/2009 | Pierce et al. |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1* | 9/2010 | Vanderlinden et al. ...... 455/418 |
| 2010/0262638 A1 | 10/2010 | Fitzgerald |
| 2010/0291898 A1 | 11/2010 | Sanding et al. |
| 2010/0311391 A1 | 12/2010 | Siu et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0119716 A1 | 5/2011 | Coleman, Sr. |
| 2011/0136482 A1 | 6/2011 | Kaliner |
| 2011/0138074 A1 | 6/2011 | Onda et al. |
| 2011/0161659 A1 | 6/2011 | Himawan et al. |

(56) References Cited

U.S. PATENT DOCUMENTS

| | | |
|---|---|---|
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1* | 10/2011 | Biggs et al. ............... 709/203 |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0030512 A1 | 2/2012 | Wadhwa et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142314 A1 | 6/2012 | Mohammed |
| 2012/0158580 A1 | 6/2012 | Eram et al. |
| 2012/0188152 A1 | 7/2012 | Henzen |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0137417 A1 | 5/2013 | Urbanek |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0295902 A1 | 11/2013 | Justen et al. |
| 2013/0303142 A1 | 11/2013 | Burcham et al. |
| 2013/0310003 A1 | 11/2013 | Sadhvani Rita et al. |
| 2013/0311836 A1 | 11/2013 | Hurst Cameron et al. |
| 2013/0318518 A1 | 11/2013 | Paalanen et al. |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0065105 A1 | 3/2015 | Masterson et al. |
| 2015/0094041 A1 | 4/2015 | Jung et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0304506 A1 | 10/2015 | Zhu et al. |
| 2015/0331590 A1 | 11/2015 | Yasui |
| 2015/0370428 A1 | 12/2015 | Chan et al. |
| 2016/0094931 A1 | 3/2016 | Urbanek |
| 2016/0234675 A1 | 8/2016 | Ghoshal et al. |

FOREIGN PATENT DOCUMENTS

| | | |
|---|---|---|
| JP | 5924347 B2 | 4/2015 |
| KR | 2006039974 A | 5/2006 |
| WO | 2012078753 A1 | 6/2012 |
| WO | 2013169983 A1 | 11/2013 |
| WO | WO2014020237 A1 | 2/2014 |
| WO | 2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |
| WO | WO2016130266 A1 | 8/2016 |

OTHER PUBLICATIONS

Power Modes on Your Kindle Paperwhite, dummies.com (3 pages).*
Cushing, Buy Your Kindle at Waterstones? You're Now Locked Into One Screensaver . . . the Waterstones Logo, Dec. 17, 2012, techdirt.com (10 pages).*
Extended Display Identification Data, Jul. 21, 2015, Wikipedia (13 pages).*
Benjamin, "How to change your iPhone carrier logo without jailbreaking", Dec. 31, 2012, idownloadblog.com (9 pages).*
Motorola Fone, Mar. 21, 2016, Wikipedia (6 pages).*
Motorola Fone F3 Review, Sep. 16, 2007, www.mobilegazette.com (9 pages).*
YotaPhone 2 website (saved Sep. 2, 2016), yotaphone.com (4 pages).*
Notice of Allowance dated Oct. 9, 2013, U.S. Appl. No. 13/335,941, filed Dec. 23, 2011.
Delker, Jason R., "Loading Branded Media Outside System Partition", filed Oct. 30, 2013 U.S. Appl. No. 14/066,947.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E, "Delivery of Branding Content and Customizations to a Mobile Communication Device", filed Sep. 22, 2014, International Serial No. PCT/US14/56778.

(56) References Cited

OTHER PUBLICATIONS

Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
First Action Interview Pre-Interview Communication dated Apr. 23, 2014, U.S. Appl. No. 13/622,234, filed Sep. 18, 2012.
First Action Interview Pre-Interview Communication dated Apr. 3, 2014, U.S. Appl. No. 13/763,434, filed Feb. 8, 2013.
Foreign Communication from a Related Counterpart—International Search Report and Written Opinion, dated Nov. 14, 2013, PCT/US13/55023, filed on Aug. 15, 2013.
Mauer, Brian D., et al., "Automatic Branding of Generic Applications", filed Jan. 10, 2013, U.S. Appl. No. 14/152,627.
Urbanek, Robert E., "Generic Mobile Devices Customization Framework", filed Aug. 15, 2013, International Serial No. PCT/US13/55023.
Annan, Brandon C., et al.,"System and Method of Storing Service Brand Packages on a Mobile Device", filed Jan. 30, 2014, International Serial No. PCT/US14/13936.
Annan, Brandon C., et al.,"System and Method of Provisioning and Reprovisioning a Mobile Device Based on Self-locating", filed filed Jan. 30, 2014, International Serial No. PCT/US14/13939.
Foreign Communication from a Related Counterpart—International Search Report and Written Opinion, PCT/US2011/063736.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Urbanek, Robert E., "System and Method of Wireless Communication", filed Dec. 7, 2010, U.S. Appl. No. 12/962,620.
Urbanek, Robert E., "System and Method for Generic Mobile Phone Configuration", filed Jul. 24, 2012, U.S. Appl. No. 13/556,202.
Urbanek, Robert E., "System and Method for Generic Mobile Phone Configuration", filed Jan. 28, 2013, U.S. Appl. No. 13/752,386.
Delker, Jason R., "Loading Branded Media Outside System Partition", filed May 31, 2011 U.S. Appl. No. 13/149,505.
Burcham, Robert H., et al., "Self-Identification of Brand and Branded Firmware Installation in a Generic Electronic Device", filed May 9, 2012 U.S. Appl. No. 13/468,028.
Mauer, Brian D., et al., "Automatic Branding of Generic Applications", filed Dec. 23, 2011 U.S. Appl. No. 13/335,941.
Urbanek, Robert E., "Generic Mobile Devices Customization Framework", filed Sep. 18, 2012, U.S. Appl. No. 13/622,234.
Annan, Brandon C., et al.,"System and Method of Branding and Labeling a Mobile Device", filed Mar. 15, 2013, U.S. Appl. No. 13/844,104.
Annan, Brandon C., et al.,"System and Method of Storing Service Brand Packages on a Mobile Device", filed Feb. 8, 2013, U.S. Appl. No. 13/763,428.
Annan, Brandon C., et al.,"System and Method of Provisioning and Reprovisioning a Mobile Device Based on Self-locating", filed Feb. 8, 2013, U.S. Appl. No. 13/763,434.
Ghoshal, Jagannath, et al.,"Rebranding a Portable Electronic Device While Maintaining User Data", filed May 22, 2013, U.S. Appl. No. 13/899,567.

Ghoshal, Jagannath, et al.,"System and Method for Retrofitting a Branding Framework into a Mobile Communication Device", filed May 21, 2013, U.S. Appl. No. 13/899,566.
First Action Interview Pre-Interview Communication dated Aug. 13, 2013, U.S. Appl. No. 13/335,941, filed Dec. 23, 2011.
First Action Interview Pre-Interview Communication dated Sep. 22, 2014, U.S. Appl. No. 13/468,028, filed May 9, 2013.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication From a Related Counterpart Application, International Search Report and Written Opinion dated Jan. 24, 2014, International Application No. PCT/US13/68981 filed on Nov. 7, 2013.
Spanel, Robert L., et al., Patent Application entitled "Dynamic Remotely Managed SIM Profile" U.S. Appl. No. 13/744,847, filed Jan. 18, 2013.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International International No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.

(56) References Cited

OTHER PUBLICATIONS

Foreign Communication from a Related Counterpart—International Search Report and Written Opinion, dated Jun. 34, 2014, PCT/US14/16650, filed on Feb. 16, 2014.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Notice of Allowance dated Jun. 21, 2013, U.S. Appl. No. 13/752,386, filed Jan. 28, 2013.
Notice of Allowance dated Aug. 9, 2013, U.S. Appl. No. 13/149,505, filed May 31, 2013.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Foreign Notice of Allowance dated Mar. 21, 2016, Japanese Application Serial No 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.

(56) References Cited

OTHER PUBLICATIONS

Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Final Office Action dated Nov. 4, 2015, U.S. Appl. No. 13/468,028, filed May 9, 2012.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Urbanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
Ghoshal, Jagannath, et al., "Dynamic Subscriber Identity Module," filed Feb. 11, 2015, U.S. Appl. No. 14/619,677.
Notice of Allowance dated Apr. 13, 2016, U.S. Appl. No. 14/877,215, filed Oct. 7, 2015.
EP Search Report dated May 17, 2016, European Application No. 14749499.1, filed on Feb. 8, 2013.
Noitice of Allowance dated May 6, 2016, U.S. Appl. No. 14/820,522, filed Aug. 6, 2015.
Advisory Action dated May 3, 2016, U.S. Appl. No. 14/060,712, filed Oct. 23, 2013.
Advisroy Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
Office Action dated May 10, 2016, U.S. Appl. No. 14/163,035, filed Jan. 24, 2014.
Final Office Action dated Jun. 14, 2016, U.S. Appl. No. 13/968,259, filed Aug. 15, 2013.
Notice of Allowance dated Apr. 20, 2016, U.S. Appl. No. 14/297,429, filed Jun. 5, 2014.
Notice of Allowance dated Apr. 13, 2016, U.S. Appl. No. 14/163,041, filed Jan. 24, 2014.
Final Office Action dated Apr. 19, 2016, U.S. Appl. No. 14/231,718, filed Mar. 31, 2014.
Advisory Action dated Jun. 28, 2016, U.S. Appl. No. 14/231,718, filed Mar. 31, 2014.
Delker, Jason R., et al. "Network Access Tiered Based on Application Launcher Installation," filed May 25, 2016, U.S. Appl. No. 15/164,530.
EP Search Report dated Jul. 7, 2016, European Application Serial No. 13871478.7 filed on Jan. 18, 2013.
EP Search Report dated Aug. 24, 2015, European Application Serial No. 14749462.9, filed on Feb. 8, 2013.
Notice of Allowance dated Aug. 18, 2016, U.S. Appl. No. 13/968,259, filed Aug. 15, 2013.
Office Action dated Oct. 6, 2016, U.S. Appl. No. 14/231,718, filed Mar. 31, 2014.

\* cited by examiner

ELECTRONIC FIXED BRAND LABELING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices may be branded for marketing or traceability purposes. Conventionally, branding information may be displayed on a phone cover or on an edge of the display that is outside of the active area. The branding information may be displayed as a splash screen, a logo, a mark associated with the telecommunications service provider, or other attention-catching words, graphics, or combinations thereof. A phone or other electronic computing device may be branded more than once during its lifetime. This change in branding may be due to the phone changing hands, changing telecommunications service providers, or both.

SUMMARY

In an embodiment, a method of setting branding on an electrophoretic display of a portable electronic device is disclosed. The method comprises determining, by an application on a portable electronic device, when the portable electronic device is powered on, if a branding from a branding package is set for display on an electrophoretic display of the portable electronic device, wherein the determination is based on whether an internal indicator of the portable electronic device is in an unlocked position and retrieving, by the application, in response to a determination that the indicator is in an unlocked position, information from at least one of a brand identifier or a device identifier. The method further comprises selecting, based on the information retrieved, the branding associated with a telecommunications service provider, loading the selected branding, displaying, on a graphical user interface of the portable electronic device, the selected branding, and locking the selected branding, wherein locking the selected branding comprises changing the internal indicator to a locked position.

In an embodiment, a system of setting branding on an electrophoretic display of a portable electronic device is disclosed. The system comprises a server comprising information regarding a plurality of portable electronic devices on a telecommunications network and a portable electronic device. The portable electronic device comprises an electrophoretic display, an application, wherein the application determines if a branding associated with the current telecommunications provider is set, and retrieves, in response to a determination that the branding has been previously set, information from a brand identifier, wherein the determination is based on whether an internal indicator is set to a locked position, wherein the locked position indicates that the branding has been set, a user memory partition, and a carrier memory partition.

In an embodiment, a method of setting branding on an electrophoretic display of a portable electronic device is disclosed. The method comprises determining, by an application on a portable electronic device, in response to the portable electronic device being powered on, if a first branding is set for display on the graphical user interface of the portable electronic device wherein the determination is based on whether an internal indicator of the portable electronic device is in an unlocked position. The method further comprises retrieving, by the application, from a branding identifier in response to a determination that the indicator is in a locked position, information as to what first branding is set for display. The method further comprises determining, by the application, if the first branding set for display is the correct branding based on a comparison between the first branding and the branding retrieved from the brand identifier. The method further comprises displaying at least one of the first branding set for display or a second branding, wherein the first branding is displayed in response to a determination that the information from the brand identifier matches the branding set for display and wherein a second branding is displayed in response to a determination that the information from the brand identifier does not the match the branding set for display, and wherein the second branding is based at least in part on the information retrieved by the application from the brand identifier.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
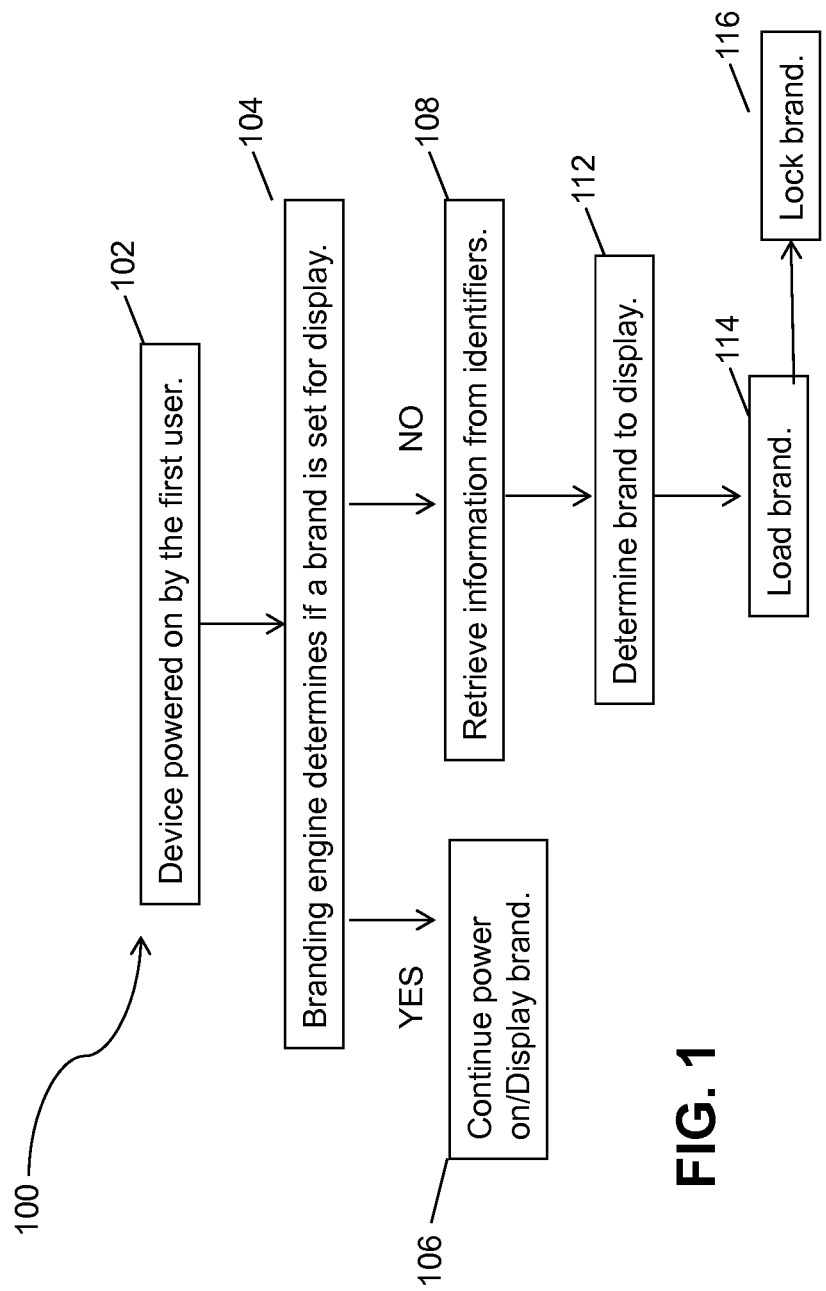
FIG. 1 is a flowchart of a method of setting branding on a portable electronic device according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Device manufacturers and telecommunications service providers may want to brand electronic devices to indicate the original equipment manufacturer (OEM) and/or the telecommunications service provider that supports the device. These type of branding initiatives may be intended to promote the brand(s) when the user of the device is, for example, in public with a portable electronic device, or in another example when they are having a gathering at home or at work where various electronic devices may be in use. Conventionally, branding may have been accomplished by information located on the battery cover or on the phone cover, or along the border of the display. As discussed herein, electrophoretic (EP) screen branding may be used in electronics devices such as mobile phones, personal computers, personal digital assistants (PDA), tablets, and other portable and stationary electronic devices. Electrophoretic displays may be used to display information on electronic devices such as mobile phones, personal computers, personal digital assistants (PDA), tablets, and other portable and stationary electronic devices.

Electrophoretic displays may be flexible, consume only small amounts of power, can be read in the sunlight and used on thin devices while maintaining a wide viewing angle and without adding significant weight to the device. In addition, electrophoretic displays may have environmental benefits. A device may display branding information using electrophoresis. Described herein are systems and methods that enable a device to load and lock information such as branding, marketing blitzes, or special sales into an electrophoretic display by setting a parameter to a "locked" or an "unlocked" position. In the locked position, after a brand is initially set, the information has been set and can only be changed if there is a factory reset or if a periodic check determines that the set information is not the current information. Electrophoretic branding may result in the display of a brand name, a brand logo, a brand graphic, marketing blitz information, special sales information, or other branding or marketing information when the phone is powered on or off. In some embodiments, the brand information may be displayed when the phone is idle. This electrophoretic branding information may be loaded at the factory by the device manufacturer (OEM) or upon activation by a telecommunications service provider. In some embodiments, the branding information, which may also be referred to as a brand identifier, may be stored locally on the device, for example, in a carrier memory partition or a user memory partition. The brand identifier may be used in conjunction with a device identifier that can be used to access information about the device such as the display size, active display area size, and resolution. Said in other words, knowing the device identifier, a device model can be determined; knowing the device model, the specifications of the device can be determined, such as device display size, device active display area size, device display resolution, and other like specifications.

In an embodiment, a device displays information, for example, brand information associated with the telecommunications provider of a portable electronic device, on a graphical user interface (GUI) of a device when the device is powered on and may display the same information when the device is not powered on because that information has been associated with the device and may not be changed manually. In another embodiment wherein a device comprises more than one GUI, the information may be displayed on one or more than one GUI including up to all GUIs associated with a device in the same manner as described above.

In an embodiment, during an initial activation of a device, for example a portable electronic device, the device may be powered on, and an application on the device, may communicate with the mobile device to determine if a brand has been set for that device. If a brand has been set, for example, by the OEM or telecommunications service provider remotely while the phone was with the OEM, the phone may proceed with activation and/or use. The device may be opened remotely based on mediation by an application that monitors the state of the phone and allows the parameter to be changed under certain conditions. In one example, a customer care representative accessing the device remotely may provide a password to this application to request that the application reset to a factory default or otherwise unlock and re-lock the parameter. The application controls access to change the parameter related to the branding/network identifier to prevent further intentional or unintentional access to the device. If the application determines that no brand has been set, the application may identify what network the portable electronic device is on. This identification may be done using a unique brand identifier stored on the mobile device or by a push from the telecommunications network that communicates information to the portable electronic device once it is powered on. It is appreciated that while the brand identifier may only comprise information regarding what telecommunications network is associated with the portable electronic device, it may further comprise device information including the active display size, screen size, and resolution of the portable electronic device. The application may determine the telecommunications provider that provides service to the portable electronic device and may simultaneously or subsequently analyze the screen resolution and size to further determine the appropriate branding to display, as there may be different options for different screen resolutions as well as sizes.

The brand information may be stored locally on the portable electronic device in a pre-loaded package that may be located in a carrier memory partition or in a user memory partition. In an embodiment, the portable electronic device comprises an internal indicator that, as compared to the unique brand identifier, does not indicate which brand should be displayed but rather indicates if the branding display may be written or changed. In an embodiment, the internal indicator is a stored parameter, a value that is stored in the memory on the device that is used for the purpose described herein, storing a value of "locked" or "unlocked" for the electrophoretic display. This parameter allows the electrophoretic display to be written if it is in the "unlocked" state and disallows the electrophoretic display to be written if it is in the "locked" state. For example, a device driver that may be used to write to the electrophoretic display may read the value of the parameter before attempting to write to the electrophoretic display.

While branding of a portable electronic device may initially occur upon activation of the portable electronic device, re-branding may occur under a variety of circumstances. The users of portable electronic devices may switch their devices for new versions based upon a newly released device or problems with their device. In some circumstances, the portable electronic device may be refurbished at the manufacturer and in other circumstances a reset or wipe may be performed in-store and the device passed to someone known to the original user. In any of these circumstances, the parameter may be reset to "unlocked" and the electrophoretic display may be written to a default condition or blanked.

In another embodiment, a portable electronic device may be powered up in the course of use, that is, not for the first time as a new portable electronic device or after refurbishment or wiping. Periodically upon power up, the application may perform a check to determine (1) if branding or sales/marketing information is present and (2) if the correct branding or sales/marketing information is present. It is appreciated herein that the use of the terms "brand" or "branding" may also encompass sales and/or marketing information. As discussed above, if the application determines that no brand has been set, the application may identify what network the portable electronic device is on and install or activate the appropriate branding. This identification may be performed using an information package and/or a unique brand identifier stored on the mobile device. In an embodiment, the information package and/or the unique brand identifier may be stored in whole or in part locally on the device or may be stored in whole or in part on a telecommunications network that communicates information to the portable electronic device once it is powered on. However, in this example where this is not the first time the portable electronic device has been powered up for activation, nor has portable electronic device been refurbished or otherwise reset by the factory or another party, the application first identifies if any brand has been set.

If a brand has been set, the application then confirms whether the correct brand is set. In order to confirm the brand, the application may retrieve information from the brand identifier to determine the brand that should be set for display (current brand). If the brand set for display and the current brand are the same or equivalent as determined by the application, the brand set for display may be displayed on the portable electronic device. If it is determined that the brand set for display is not the same as or equivalent to the current brand, the current brand may be loaded as discussed above as may be done upon startup or after refurbishment. The current brand and the brand set for display may be determined to be the same or equivalent based on factors including the telecommunications service provider including subsidiaries and parent companies of the telecommunications service provider, the resolution of the electrophoretic display of the portable electronic device, the screen size of the graphical user interface of the portable electronic device, and the active display area of the device if that is different than the electrophoretic display area.

It is appreciated that a brand that was previously electrophoretically set may have been changed because the telecommunications service provider for the phone has changed, by the user's choice, by the phone being passed to another party, or by a merger or acquisition involving the telecommunications service provider or its parent company or subsidiary. In another embodiment, an alert may be sent to the device that may trigger the electrophoretic display to display an earthquake alert or a theft alert, wherein the word "alert" or "theft" may be displayed on the electrophoretic display which is unlocked in order to display the word. The alert may come from the Commercial Mobile Telephone Alerts (CMAS) system or from the SoftBank Emergency Earthquake Alert. The actual alert, earthquake, news, other weather, or another alert message comprising more than just a word may also be sent to the device, wherein the alert message comprises an explanation and/or description of what the alert actually is.

FIG. 1 is a flowchart of a method of setting branding on a portable electronic device. In method 100, a device, for example, a portable electronic device, portable digital assistant (PDA), tablet, personal computer, or other computing device comprising a display is powered on by a first user at block 102. The display may be an electrophoretic display that may display various artifacts such as branding from the telecommunications service provider. The branding artifacts may comprise the telecommunications service provider's name, logo, or may comprise another representative static or dynamic artifact intended to promote brand recognition. In an alternate embodiment, the artifacts may be related to sales and/or marketing initiatives. In this example, the portable electronic device may have come straight from the OEM and/or telecommunications service provider wherein the first user is the first user of that portable electronic device. Once the portable electronic device has been powered on at block 102, the application determines if a brand is set for display at block 104. In an embodiment, the brand displayed may be the brand of the OEM or of the telecommunications service provider that supports the device, or a parent or subsidiary of that provider. The application determines if the brand has been set, for example, by electrophoretic display. The brand may be visible once it has been set when the phone is powered on, powered off, and wherein the brand may be visible even if the phone is powered off. As discussed in detail below, setting the brand involves loading and locking the brand so that the brand cannot be manually changed unless there has been a brand-changing event as discussed herein.

At block 106, if the application determines that a brand is set for display, the brand may then be displayed and the power-on is completed. If the application determines at block 104 that a brand has not been set for display, the application may retrieve information from a brand identifier stored on the device at block 108. The information retrieved may comprise network information indicating what brand should be set for electrophoretic display. In addition at block 108, the application may retrieve device information from a device identifier information regarding the graphical user interface (GUI) and/or electrophoretic display of the portable electronic device such as the screen resolution, size, and area of display size if it is not the same as the screen size. The brand identifier may be stored on the portable electronic device or may be stored on a remote server of the OEM and/or the telecommunications service provider. In another embodiment, application may select which brand of a plurality of available brands to use based on at least one of the screen size, resolution, and display size. The brand may also be referred to herein as "branding," and the plurality of brands may be a brand or branding package that may be pre-loaded onto a device or may be retrieved from a network. At block 112, the application determines and/or selects the brand to display based at least in part on the information received by the application from the brand identifier. At block 114, a brand that is selected by the application is loaded on to the GUI. The brand loaded at block 114 is locked and/or set as a default brand at block 116. In an embodiment, this may mean that the internal indicator discussed above is set in the "locked" position, that is, that locking the brand comprises setting a parameter in the memory of the device to represent a locked state. In an embodiment, when the phone is subsequently powered on after the brand is locked at block 116, the branded locked at block 116 is displayed on the GUI of the portable electronic device when the device is powered on, powered off, idle, or when the device is turned completely off.

Figure 2:
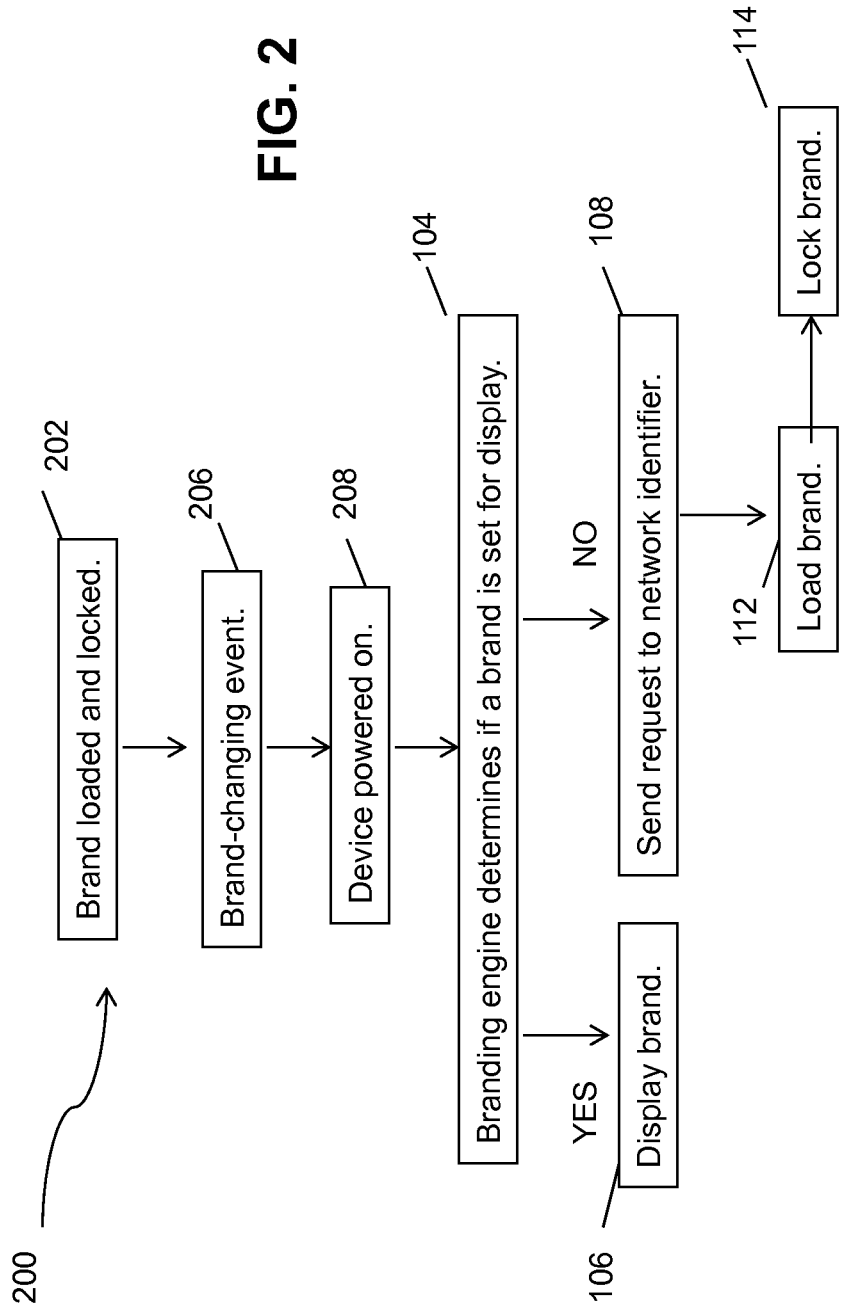
FIG. 2 is a flow chart of a method of re-setting branding on a portable electronic device according to an embodiment of the disclosure.

FIG. 2 is a flow chart of a method of re-setting a brand on a portable electronic device. In method 200, a brand is loaded and locked at block 202 into a portable electronic device, for example, using method 100 as discussed in FIG. 1. At block 206, a brand-changing event associated with the portable electronic device occurs. This brand-changing event may occur because the portable electronic device experiences a change in at least one of the owner or the telecommunications service provider. This change may be caused by a parent giving their portable electronic device to a child, another change in ownership between private parties, a user switching telecommunications service providers, a company re-calling phones from employees, or a telecommunications service provider merging with or acquiring another provider. In an embodiment, the brand-changing event at block 206 may be a reset to factory (OEM) default settings and/or a refurbishment by the OEM and/or the telecommunications service provider which may be predicated by a change in ownership or telecommunications service provider. When the portable electronic device is powered on at block 208 subsequent to the brand-changing event at block 206, the method may proceed as discussed in FIG. 1 at blocks 104-116. In an embodiment, the device is powered on at block 208 by the OEM and/or the telecommunications service provider and the brand is re-set prior to the device being sent to a new user. In an alternate embodiment, the device is powered on at block 208 by a new user of the portable electronic device.

Figure 3:
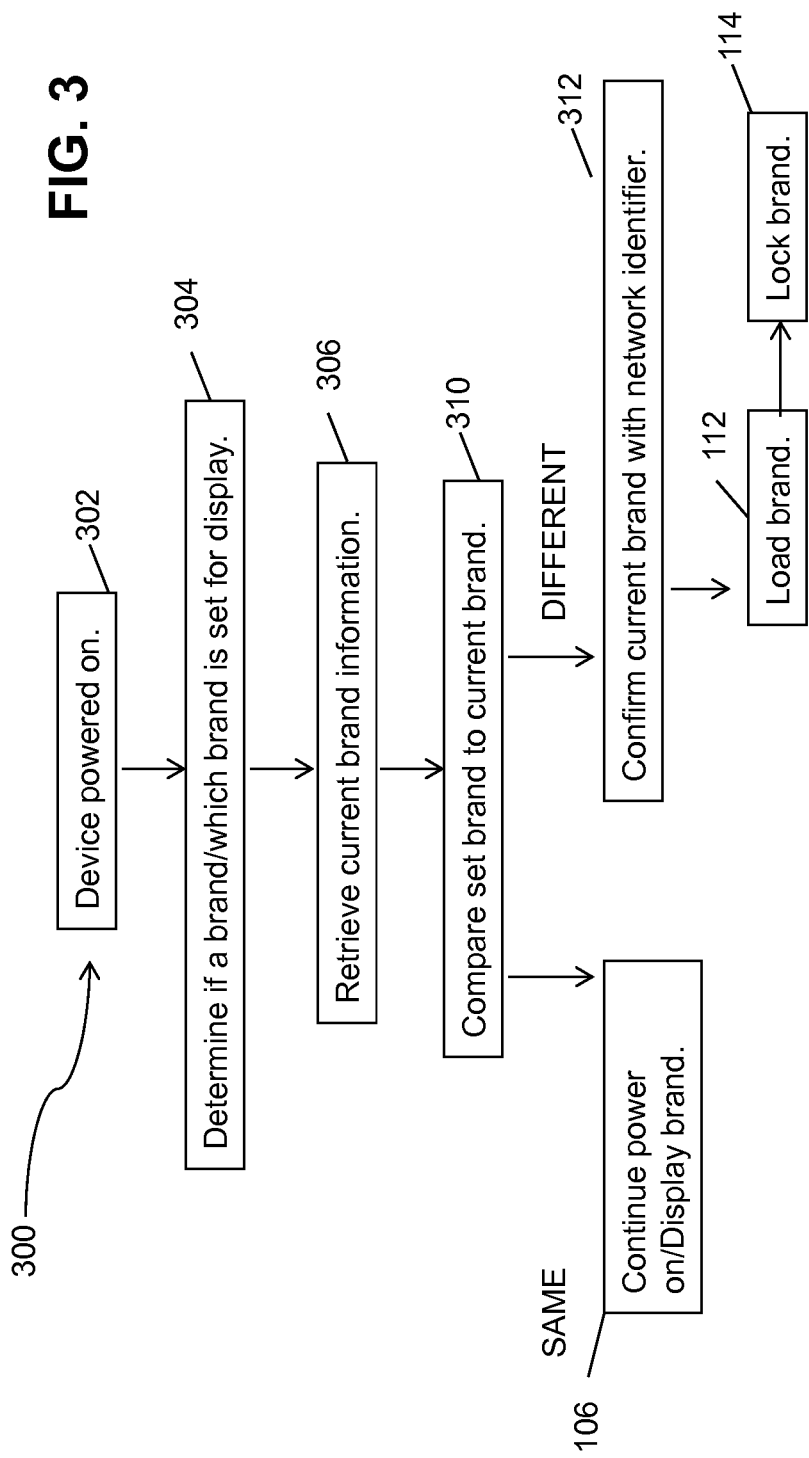
FIG. 3 is a flowchart of a method of confirming a brand on a portable electronic device according to an embodiment of the disclosure.

FIG. 3 is a flowchart of a method of confirming a brand on a portable electronic device. In method 300, a device such as a portable electronic device is powered on at block 302. In an embodiment, the powering on at block 302 is not the first time that the portable electronic device has been powered on. At block 304, an application determines that a brand is set for display and, in response to determining that a brand is electrophoretically displayed, may determine which brand is set for display. The characteristics of the graphical user interface may include display size, active display area size (selectable area), and screen resolution. At block 306, in response to determining which brand is set, the application retrieves information from a brand identifier to determine the current brand. In one embodiment, the application compares the information from the brand identifier and the brand determined at block 310. If the set brand is found to be the same as or equivalent to the current brand, the power-on is continued at block 106 and the set brand is displayed on the graphical user interface. If the set brand and the current brand are found to be different at block 310, the current brand is confirmed by the application with the brand identifier. The method may proceed to blocks 112, and 114 as discussed in FIG. 1, wherein the current brand is loaded, locked and displayed on the graphical user interface of the portable electronic device.

Figure 4:
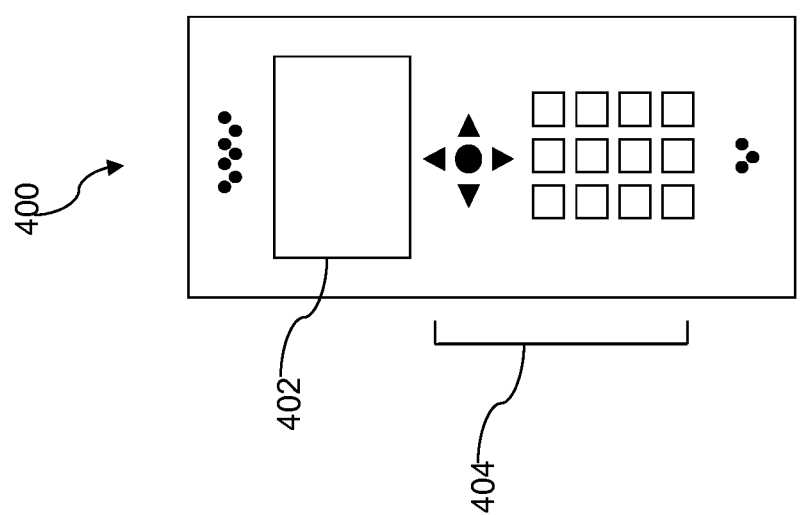
FIG. 4 depicts a mobile device which is operable for implementing aspects of the present disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station 414 as shown in FIG. 4A and discussed below, a wireless network access node, a peer mobile device 400 or any other wireless communication network or system.

Figure 4A:
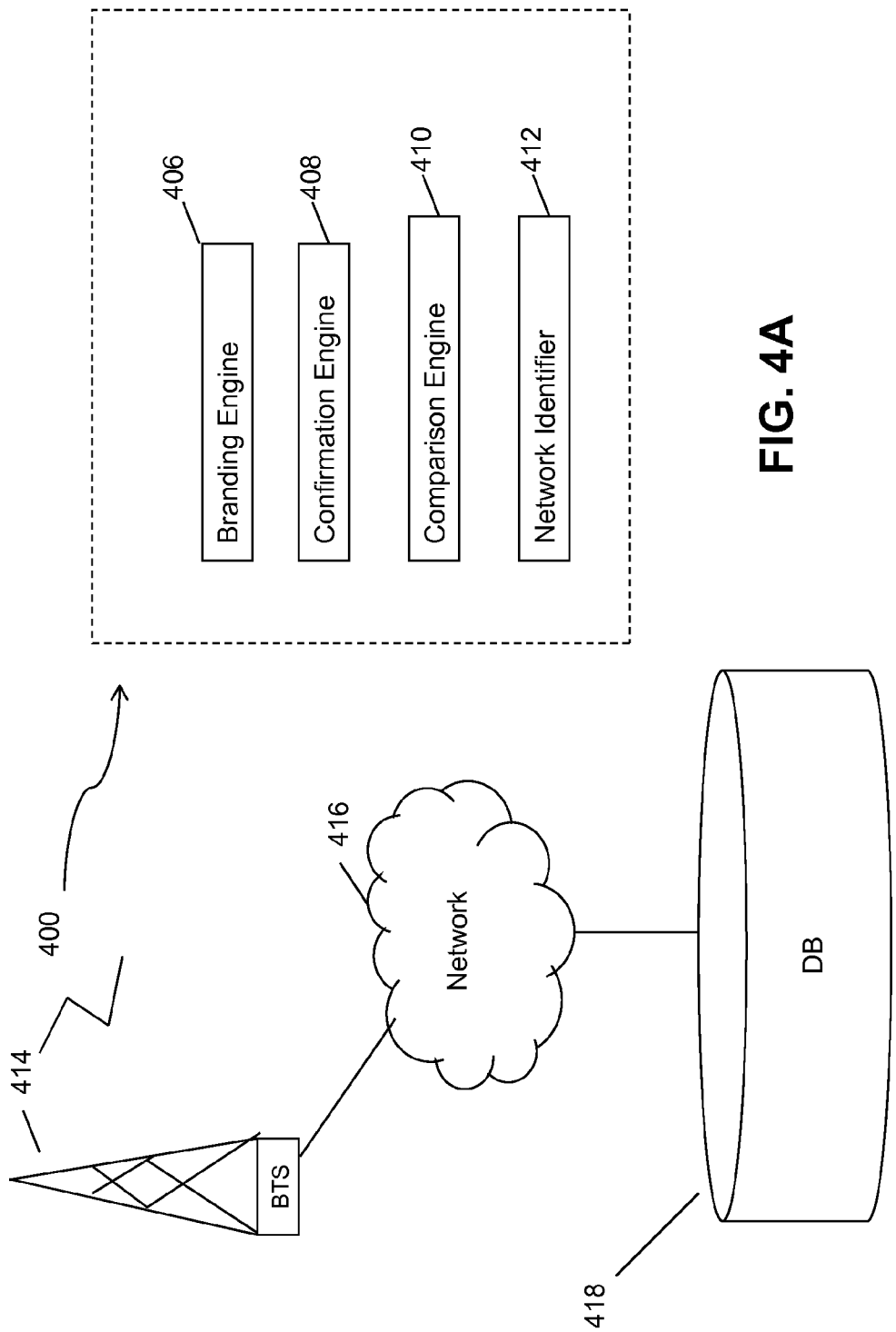
FIG. 4A is an illustration of a system for setting and checking branding on a portable electronic device.

FIG. 4A is an illustration of a system for setting and checking branding on a portable electronic device. The mobile device 400 may be as discussed in FIGS. 4 and 5. A base transceiver station 414 may communicate with a network 416 and a data store 418 which the portable electronic device such as a mobile phone 400 may be associated with. The mobile device 400 may comprise an application that comprises a branding engine 406, a confirmation engine 408, a comparison engine 410, and a network identifier 412. The mobile device 400 may also comprise a network identifier 412 that may comprise information as to what telecommunications service provider supports the mobile device 400. The mobile device executes the application illustrated by 406-408 in response to being powered on for the first time, powered on subsequent to a brand being deleted, and on a periodic basis when a brand has been set and locked as discussed in FIGS. 1-3. It is appreciated that, in an embodiment, the methods 100-300 discussed above may be performed entirely on mobile device 400.

Figure 5:
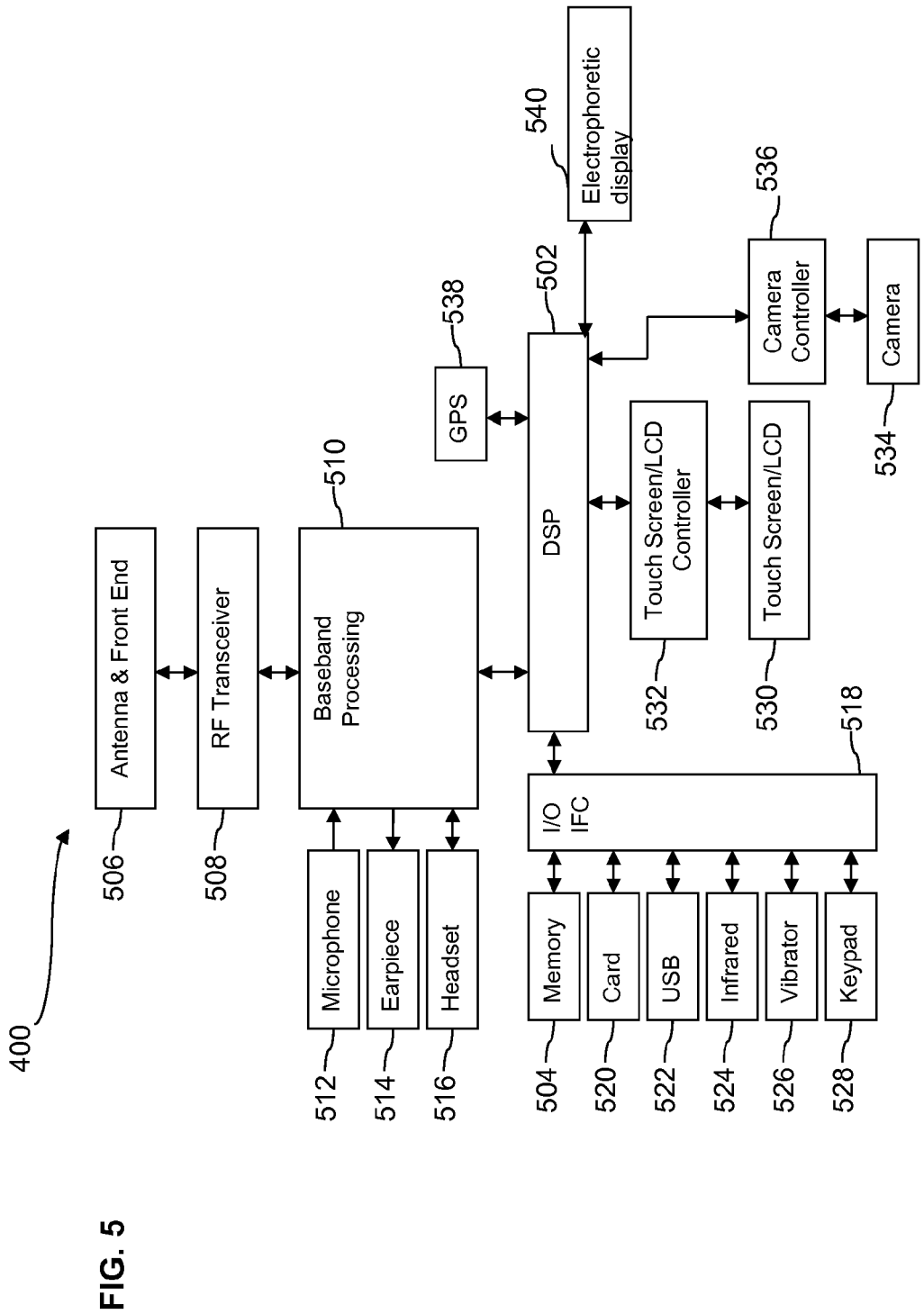
FIG. 5 shows a block diagram of the mobile device.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, a global positioning system (GPS) receiver 538, and an electrophoretic display 540. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6:
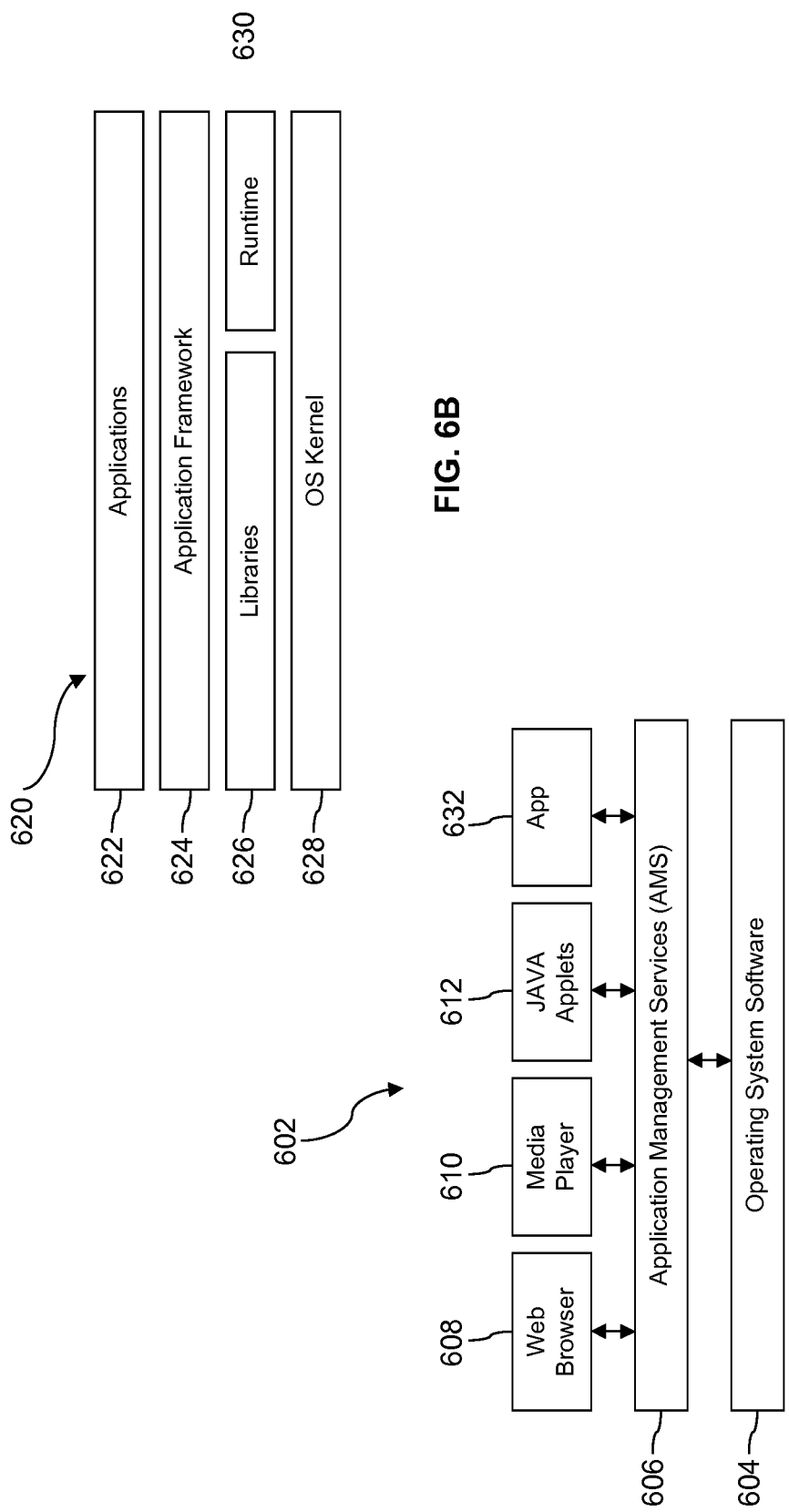
FIGS. 6A and 6B are illustrations systems which are operable for implementing aspects of the present disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612, and branding application 632 that may also be referred to as a network identifier application. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
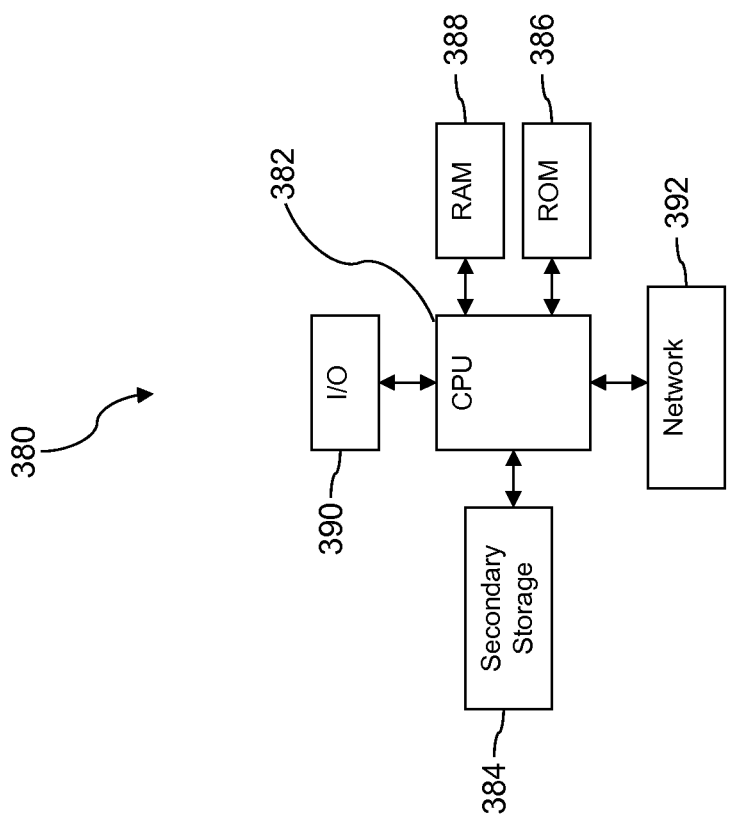
FIG. 7 illustrates a computer system suitable for implementing one or more embodiments disclosed herein.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of setting branding on an electrophoretic display of a mobile phone comprising:
   determining, by an application stored in a non-transitory memory on a mobile phone while the mobile phone is powered on, if a branding from a branding package is set for display on an electrophoretic display of the mobile phone, wherein the determination is based on whether an internal indicator of the mobile phone is in an unlocked state, and wherein the internal indicator is stored in the non-transitory memory and comprises a value of locked or unlocked;
   retrieving, by the application in response to a determination that the indicator is in an unlocked state, information from at least one of a brand identifier or a device identifier;
   selecting, based on the information retrieved, the branding associated with a telecommunications service provider;
   loading branding information associated with the selected branding of the telecommunications service provider;
   locking the branding information associated with the selected branding into the electrophoretic display, wherein locking the branding information associated with the selected branding comprises changing the internal indicator to a locked state; and
   displaying, on the electrophoretic display of the mobile phone, the branding information associated with selected branding while the mobile phone is powered off, wherein the electrophoretic display and the branding information displayed on the electrophoretic display cannot be changed while the internal indicator is in the locked state.

2. The method of claim 1, wherein the branding package is stored on at least one of the mobile phone or on a remote server.

3. The method of claim 1, wherein the plurality of brands is pre-loaded on to the mobile phone by one of the mobile phone manufacturer or the telecommunications service provider.

4. The method of claim 1, wherein the locked branding is displayed when the mobile phone is subsequently powered on.

5. The method of claim 1, wherein powering on the device comprises powering on the mobile phone by a first user of the mobile phone.

6. A system of setting branding on an electrophoretic display of a mobile phone comprising:
   a server comprising at least one server processor and a server non-transitory memory, wherein information regarding a plurality of mobile phones on a telecommunications network is stored in the server non-transitory memory; and
   a mobile phone, wherein the mobile phone comprises:
      a processor;
      an electrophoretic display;
      a non-transitory memory comprising a user memory partition and a carrier memory partition; and
      an application stored in the non-transitory memory and executable on the processor, wherein the application:
         determines if an initial branding associated with a current telecommunications provider is set, based on whether an internal indicator stored in the non-transitory memory comprises a locked state, wherein the locked state indicates that the initial branding is set,
         retrieves, in response to the determination that the initial branding has been previously set, information from a brand identifier and a device identifier, wherein the device identifier comprises a plurality of information comprising at least a screen size, an active display size, and a screen resolution associated with the mobile phone,
         changes the internal indicator to an unlocked state,
         in response to a determination that the internal indicator comprises an unlocked state, selects a subsequent branding of a branding package associated with a subsequent telecommunications service provider to be displayed,
         loads branding information associated with the selected subsequent branding of the subsequent telecommunications service provider,
         locks the branding information associated with the selected subsequent branding into the electrophoretic display by changing the internal indicator to the locked state; and
         displays the branding information associated with the selected subsequent branding of the subsequent telecommunications services provider on the electrophoretic display of the mobile phone, wherein the electrophoretic display and the branding information displayed on the electrophoretic display cannot be changed while the internal indicator is in the locked state.

7. The system of claim 6, wherein the brand identifier is stored on the mobile phone in at least one of the carrier memory partition or the user memory partition.

8. The system of claim 6, wherein at least a portion of the information of the device identifier is retrieved by the application.

9. The system of claim 6, wherein the brand identifier comprises the subsequent telecommunications service provider associated with the mobile phone.

10. The system of claim 6, wherein, in response to being locked, the branding is electrophoretically displayed while the mobile phone is powered off.

11. The system of claim 10 wherein, in response to being locked, the branding is electrophoretically displayed when the mobile phone is powered on.

12. A method of setting branding on a display of a mobile phone comprising:
   determining, by an application on a mobile phone, in response to the mobile phone being powered on, if an initial branding is set for display on a display of the mobile phone, wherein the determination that the initial branding is set is based on whether an internal indicator stored in a non-transitory memory of the mobile phone comprises a locked state;
   retrieving, by the application, from a branding identifier, a plurality of branding information;
   determining, by the application, if the initial branding set for display is the correct branding based on a comparison between the initial branding and the plurality of branding information retrieved from the brand identifier;

in response to a determination that the information from the brand identifier does not match the initial branding set for display, changing, by the application, the internal indicator to an unlocked state;

in response to a determination that the internal indicator comprises an unlocked state, selecting, by the application, a subsequent branding of a telecommunications service provider to be displayed based at least in part on the information retrieved by the application from the brand identifier;

loading, by the application, branding information associated with the selected subsequent branding;

locking, by the application, the branding information associated with the selected subsequent branding into the display by changing the internal indicator to the locked state; and displaying the branding information associated with the selected subsequent branding on the display of the mobile phone while the mobile phone is powered off, wherein the display and the branding information displayed on the display cannot be changed while the internal indicator is in the locked state.

13. The method of claim 12, further comprising a device identifier, wherein the device identifier comprises a plurality of information comprising at least a screen size, an active display size, a screen resolution, and a telecommunications network associated with the mobile phone.

14. The method of claim 12, wherein the mobile phone has been previously powered on.

15. The method of claim 12, wherein the initial branding and the subsequent branding are at least one of different sizes, different resolutions, or are associated with different telecommunications service providers.

16. The method of claim 12, wherein the initial branding is from one of the telecommunications service provider, a subsidiary of the telecommunications service provider, and a parent company of the telecommunications service provider.

17. The method of claim 12, wherein the brand identifier comprises the telecommunications service provider associated with the mobile phone.

* * * * *